United States Patent [19]

Haizinger

[11] 4,024,594

[45] May 24, 1977

[54] APPARATUS FOR CONNECTING A SHOE SOLE TO ITS SHAFT

[75] Inventor: Ferdinand Haizinger, Köflach, Austria

[73] Assignee: Koflach Sportgerate Ges. m.b.H., Vienna, Austria

[22] Filed: May 19, 1976

[21] Appl. No.: 687,938

Related U.S. Application Data

[62] Division of Ser. No. 552,746, Feb. 25, 1975, Pat. No. 3,972,087.

[30] Foreign Application Priority Data

Feb. 27, 1974 Austria .............................. 1618/74

[52] U.S. Cl. ............................. 12/4.2; 12/142 RS; 425/119
[51] Int. Cl.² .................. A43D 89/00; A43D 9/00; A43G 1/20
[58] Field of Search ........... 12/145, 142 R, 142 RS, 12/4.1, 4.2, 17 R; 425/119

[56] References Cited

UNITED STATES PATENTS 3,332,097  7/1967  Rollman et al. ............... 12/142 RS
3,742,544  7/1973  Auberry et al. ............... 12/142 RS

FOREIGN PATENTS OR APPLICATIONS 2,514,253  11/1975  Germany ................ 12/142 RS Primary Examiner—Patrick D. Lawson
Attorney, Agent, or Firm—Cushman, Darby & Cushman

[57] ABSTRACT

Apparatus for connecting the sole of a shoe with its shaft comprising a mold having a contour corresponding to the shape of the sole and at least two jaws being movably supported and being arranged for being pressed against the mold and for laterally enclosing the mold so as to bend an edge portion of the shaft against the side of the mold, said jaws being provided with rims extending in an inward direction and overlapping the edge of the mold over its total circumference, said rims having a smaller height as compared with the width of the protruding and bent edge of the shaft, and a press ram cooperating with the mold and having a contour approximately corresponding to the border line, facing the center of the mold, of the rims of the jaws, the mold and the press ram being formed as electrodes connected to a radio frequency generator.

6 Claims, 8 Drawing Figures

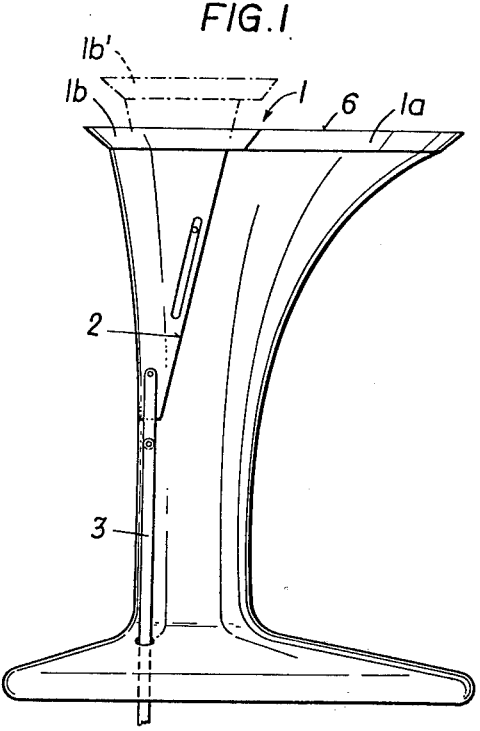
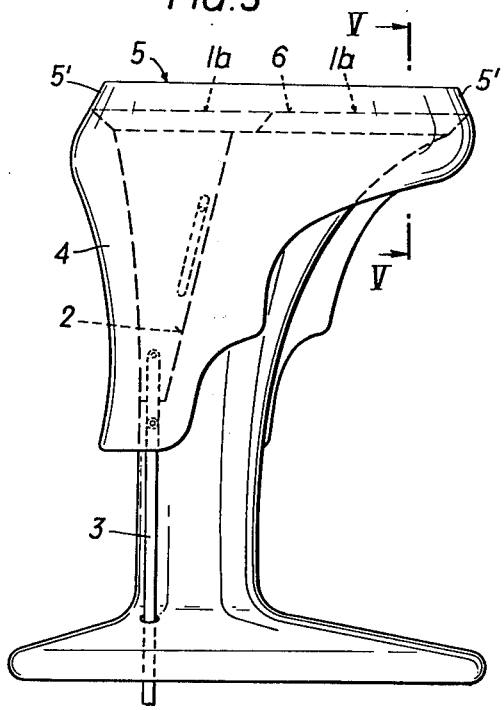
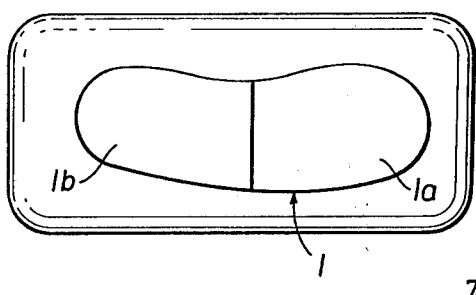
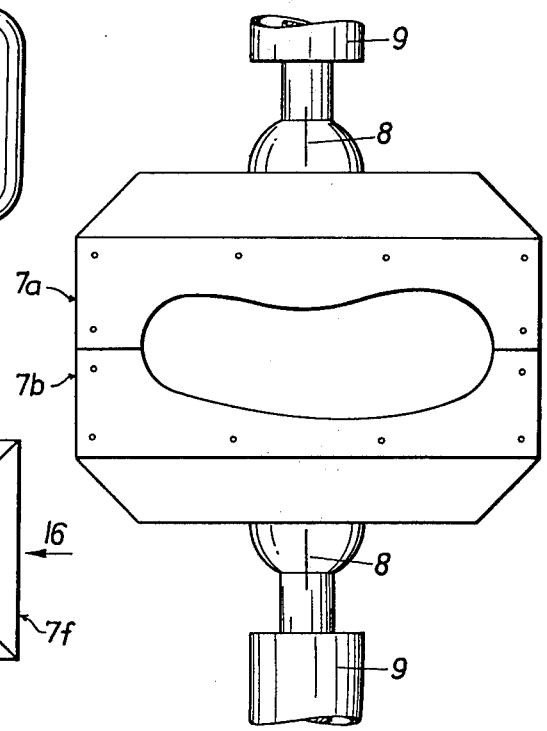
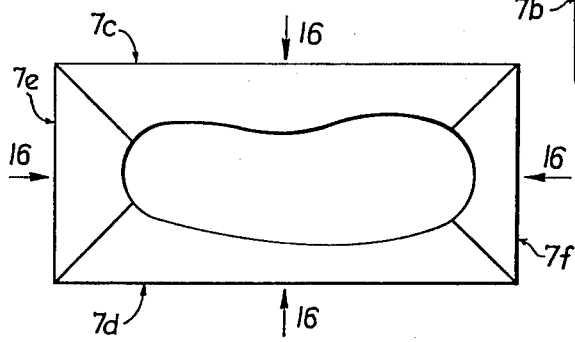

APPARATUS FOR CONNECTING A SHOE SOLE TO ITS SHAFT

This is a division, of application Ser. No. 552,746 filed Feb. 25, 1975, now U.S. Pat. No. 3,972,087.

The present invention refers to a process and an apparatus for connecting the sole of a shoe with its shaft, noting that said sole and said shaft consist at least partially of thermoplastic synthetic resin. Shoes of the type described, up till now, have been manufactured by connecting the sole with the shaft by a seam. This applies particularly to the inner boots of skiing shoes in which the transition area between shaft and sole is not supposed to show a substantially thickened portion. In this case the sole was bluntly connected to the shaft and sewed with the shaft. Such a procedure suffered from the drawback that the seam does not guarantee the required stability for the inner boot with respect to its shape, that the seam gives an unpleasant appearance to the shoe and that, in case the inner boot will be worn without the outer boot, the seam will be rapidly worn and will not be water-tight. Therefor, inner boots manufactured in the manner indicated, have been connected with the outer boot such, that it became impossible to wear the inner boot without the outer boot. When manufacturing walking boots the shaft usually is pinched over the last and connected, e.g., sewed, with an insole, whereupon a walking sole is applied onto the inner sole. For such an arrangement it is known to provide a shaft, an inner sole and a walking sole of weldable material, and to weld the walking sole with the inner sole and the shaft by means of heating with radio frequency. However, for such a procedure, it is a prerequisite to connect and sew, respectively, the shaft with the inner sole.

The present invention now aims at avoiding the drawbacks of known embodiments of shoes and of processes for producing same, and therefor, the process according to the invention, essentially consists in that the shaft is being put over a mold corresponding in its shape to the shape of the sole, noting that an edge of the shaft is arranged for protruding over said mold and that the shaft is being expanded in longitudinal direction of the mold, and in that subsequently, the protruding edge of the shaft is being bent over said mold, and that finally, the sole is being pressed in direction to the mold and is being welded with said bent edge by means of radio frequency.

By welding the sole with the edge protruding over the mold and being bent over said mold, a firm and permanent connection between the sole and the shaft can be achieved, the strength of said connection being capable of coping with any stress condition. Whereas in connecting the bluntly engaging edges of shaft and sole by seams some possibility of relative movement between shaft and sole, respectively, must be tolerated, in welding these parts a play-free connection is provided that makes the shoe stable with respect to shape. When the inner boots for skiing boots are manufactured in the manner indicated for instance, there is no danger whatsoever to damage the connection between shaft and sole when wearing the inner boot without the outer boot. When bending the protruding edge of the shaft over the mold, it might normally be possible that the material of the shaft becomes ondulated at the area of strong curvature of the sole, i.e. at the area of the heel portion and of the toe portion of the sole, which, in turn, might hamper the subsequent welding operation. However, by elongating or expanding the shaft in longitudinal direction of the mold at the area of its edge surrounding said mold, the protruding edge of the shaft will be drawn advantageously in inward direction at the area of strongest curvature, i.e. at the area of the heel portion and of the toe portion, so that the formation of ondulations will be reduced or even avoided at these areas. By welding the parts to be connected by means of radio frequency the surface portions of the parts to be welded are being heated to maximum temperature whereas the outer surface of the materials of the sole and of the shaft are not heated to such an extent or even remain cold, so that an optimal weld is obtained without detracting from appearance and quality of the outer surface.

The invention is of particular advantage for the manufacture of inner boots of skiing boots which have to be put into an outer boot and into a shell, respectively. This manner of manufacturing boots can be applied to all other types of boots as well, whereby, when a usual insole is omitted, a moccasin type of boot can be produced.

When the materials to be welded are provided with a cover layer, the thickness of materials to be welded may locally differ at the area of the welding seam to be produced and this, in view of locally differing pressures applicable, might detract from the quality of the weld obtained. Such an uneven thickness of the materials to be welded, which may be present at the area of the protruding edge of the shaft on account of ondulations of said shaft or on account of seams, or on account of cover layers, according to the invention can be countered by using a sole having a greater thickness than the thickness of the material of the shaft and consisting at least partially of foamed synthetic plastics material.

When using a sole of a greater thickness than the thickness of the shaft material, any differences in the thickness of the edge of the shaft can be compensated more easily since the material flows during the welding operation. If, in addition, the sole consists of foamed synthetic plastics material, such a compensating effect is getting even more pronounced, because foamed synthetic plastics material can, more or less, be compressed, and if necessary, compressed at the area of the greatest thickness of the edge of the shaft to such an extent that its pores disappear.

For welding shaft and sole of the shoe it is a prerequisite that both component parts consist of thermoplastic synthetic material. It will suffice if only the contacting surfaces of shaft and sole consist of thermoplastic synthetic material, which implies that the contacting material can easily be provided with a backing layer of other material than synthetic thermoplastic material, e.g. a backing layer of leather, textile material or hide.

For the welding by means of radio frequency it is advantageous that the shaft and/or the sole, respectively, consist of polyvinylchloride or, if desired, also of polyamides, polyurethanes or polyolefins.

The apparatus for performing the process according to the invention is essentially characterized by a mold having a contour corresponding to the shape of the sole and by a pair of jaws being movably supported and being arranged for being pressed against the mold and for laterally enclosing the mold, said jaws being provided with rims extending in inward direction overlapping the edge of the mold over its total circumference, noting that the rims have a smaller height than the width of the protruding and bent edge of the shaft, and further characterized by a press ram cooperating with the mold and having a contour approximately corresponding to the border line, facing the center of the mold, of the rim of the jaws, noting that the mold and the press ram are formed as electrodes being connected to a radio frequency generator. In view of the rims of the jaws overlapping the edge of the mold over its total circumference, the edge of the shaft can be uniformly bent in inward direction. In view of providing a press ram having a contour corresponding to the bordering line of the rims of the jaws facing the center of the mold, this press ram is being applied between said rims, and in view of the mold and the press ram being formed as electrodes being connected to a radio frequency generator, the welding is effected along a circumference line that is close to the edge of the rims of the jaws.

It is only essential that the height of the rims be smaller than the width of the edge of the shaft protruding over the mold so that a portion of said edge of the shaft is maintained accessible for welding. The contour of the mold can be provided with a sharp edge, noting that the rims of the jaws enclose an approximately right angle with those surfaces of the jaws which are pressed against the mold, so that the protruding edge of the shaft will be bent at a sharp angle.

The jaws are conveniently arranged for being moved in a plane being in parallel relation to the plane in which, approximately, is located the contour of the mold corresponding to the shape of the sole. Thus, the jaws are laterally shifted exactly in that direction to the mold in which the protruding edge of the shaft is to be bent, so that said edge will attain the correct bend. In the process according to the invention it is possible not only to apply plane soles to the edge of the shaft by welding, but also, to apply soles having a bent shape corresponding to the shape of the foot as this is the case in boots with heels. In the latter case the circumference of the mold does not precisely lie in a plane, but in this case it is not only necessary to shift the jaws in parallel relation to that plane in which the circumference of the mold is approximately located. When providing two jaws only, these jaws, according to the invention, can be arranged such, that the partition line of the jaws, in its position assumed when pressed against the mold, is approximately located in the longitudinal axis of the contour of the sole. This will be sufficient in those cases in which, without application of heat, the edge of the shaft will be drawn in inward direction at the areas of the toe portion and the heel portion by expanding the shaft in longitudinal direction of the mold, because under this condition the jaws can engage this edge when being laterally shifted in direction to the mold. According to the invention, the mold can be divided into two parts along an oblique plane extending in transverse direction relative to the longitudinal direction of the sole and along an angle relative to the sole deviating from a right angle, noting that both mold parts may be arranged for relative movement. By this arrangement, the length of the mold, as seen in longitudinal direction of the sole, can be reduced by relative shifting movement of both mold parts, so that the shaft can be applied to the mold and then be expanded or elongated in longitudinal direction of the sole. According to the invention, it is also possible to provide four jaws and to arrange two of them for being shifted in direction of the longitudinal axis of the circumference of the sole, and to arrange the two remaining jaws for being shifted in a direction perpendicular to said longitudinal axis.

The invention is further illustrated with reference to the drawing showing embodiments of the invention in a schematic representation.

FIGS. 1 and 2 show a mold in a side elevation and in a top-plan view, respectively.

FIG. 3 shows a mold together with the shaft applied to the mold.

FIG. 4 shows the jaws in a schematic view.

FIG. 8 shows an embodiment comprising four jaws.

Figure 5:
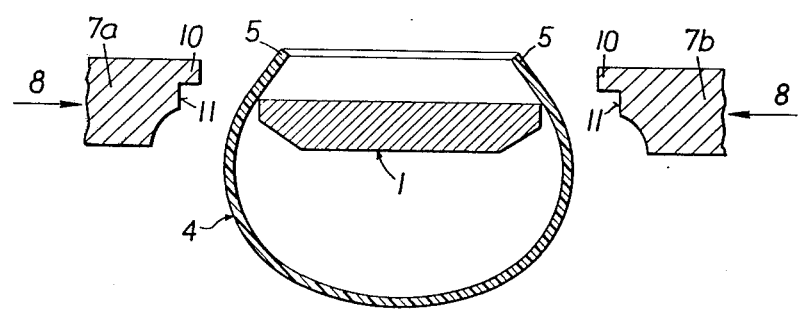
FIG. 5 shows a section along line V—V of FIG. 3 with the jaws in opened position.

1 is the mold being divided into two mold parts 1a and 1b. The mold is divided along an oblique plane 2. An operating rod 3 is connected to a pneumatic cylinder not shown. The mold part 1b can be shifted in direction of the oblique plane 2 in its position 1b', in which the mold is shorter in longitudinal direction of the sole. 4 is the shaft of the shoe, which, as shown in FIG. 3, is applied to the mold 1 such, that the edge 5 of the shaft protrudes in upward direction over the surface 6 of the mold. The shaft is being applied to the mold 1 with the mold part 1b assuming its position 1b', i.e. in shortened condition of the mold 1. In moving the mold part 1b from its position 1b' into its position 1b, the mold is given a greater length so that the edge 5 of the shaft is drawn in inward direction at its front and rear end 5'.

FIG. 4 shows two jaws 7a and 7b of electrically insulating material. These jaws can be shifted in direction of arrows 8 into the position shown in FIG. 4. Reference numerals 9 indicate pneumatically operating cylinders.

Figure 6:
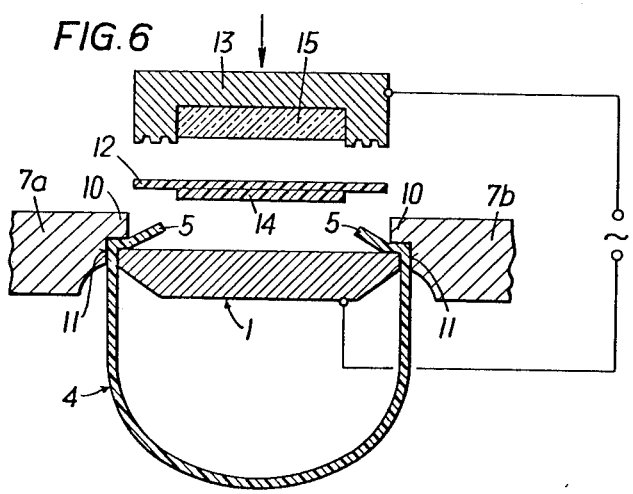
FIG. 6 shows the mold, the jaws and the press ram prior to welding the sole to the shaft.
Figure 7:
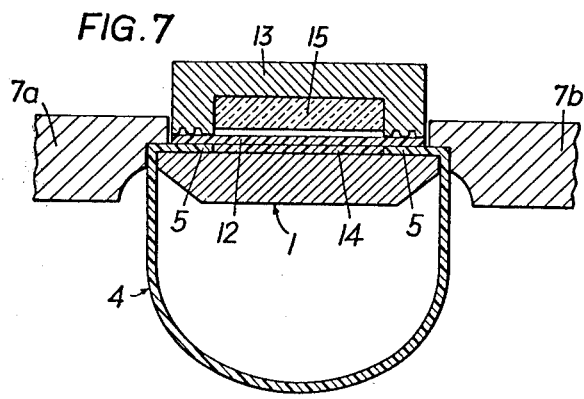
FIG. 7 shows the mold, the jaws and the press ram in closed condition during welding.

The jaws 7a and 7b are shown in FIG. 5 together with the mold 1. The jaws 7a and 7b can be shifted in direction of arrows 8 to assume the position shown in FIG. 6. The jaws 7a and 7b are provided with a rim 10 which serves for bending the edge 5 of the shaft 4 in inward direction. The jaws 7a and 7b are further provided with engaging surfaces 11 which are pressing the shaft against the side surface of the mold. At the front and rear ends of the mold, the protruding edge 5 of the shaft is drawn, as is shown in FIG. 3, in inward direction so that there, the respective edge portion can be easily engaged by the rim 10 of the jaws. As soon as the jaws 7a and 7b assume the position shown in FIG. 6, a sole 12 is brought into position for being pressed in downward direction by means of a press ram 13. During this operation, the protruding edge 5 is being brought into the position shown in FIG. 7 in which the sole 12 is being pressed against the edge 5 of the shaft. The mold 1 and the press ram 13 consist of metallic material and are connected to the terminals of a radio frequency generator. The mold 1 and the press ram 13 thus form electrodes, and by means of the high frequency alternating field, the sole 12 is being welded with the edge 5 of the shaft, noting that the sole 12 and the edge 5 represent a dielectric which is heated to welding temperature on account of its dielectric losses. 14 is a cover layer applied to the sole for compensating the thickness of edge 5. 15 is an insert consisting of electrically insulating material and serving solely for pressing in downward direction the center portion of the sole 12 and for limiting the stroke of the press ram 13.

FIG. 4 represents an embodiment comprising two jaws. Of course, it is also possible to provide, as is shown in FIG. 8, four jaws 7c, 7d, 7e and 7f, which can be moved in direction of arrow 16 into the position shown in FIG. 8.

What I claim is:

1. Apparatus for connecting the sole of a shoe with its shaft comprising a mold having a contour corresponding to the shape of the sole and at least two jaws being movably supported and being arranged for being pressed against the mold and for laterally enclosing the mold so as to bend an edge portion of the shaft against the side of the mold, said jaws being provided with rims extending in an inward direction and overlapping the edge of the mold over its total circumference, said rims having a smaller height as compared with the width of the protruding and bent edge of the shaft, and a press ram cooperating with the mold and having a contour approximately corresponding to the border line, facing the center of the mold, of the rims of the jaws, the mold and the press ram being formed as electrodes connected to a radio frequency generator.

2. Apparatus as in claim 1 wherein the jaws are arranged to be shifted in parallel relation to that plane in which the contour, corresponding to the shape of the sole, of the mold is approximately located.

3. Apparatus as in claim 1 wherein there are two jaws, the partition line of which in the position of the jaws when pressed against the mold extend approximately along the longitudinal axis of the shape of the sole.

4. Apparatus as in claim 1 wherein there are four jaws, two of which are arranged to be shifted in the direction of the longitudinal axis of the contour of the sole and two of which are arranged to be shifted in a direction perpendicular to said longitudinal axis.

5. Apparatus as in claim 1 wherein the mold is divided along an oblique plane extending in transverse direction to the longitudinal direction of the sole and along an angle relative to the sole deviating from a right angle, both mold parts being arranged for relative movement.

6. Apparatus as in claim 1 wherein the contour of the mold is bordered by a sharp edge and wherein the rims of the jaws enclose an approximately right angle with those surfaces of the jaws which can be pressed against the mold.

* * * * *